US008878666B2

(12) United States Patent
Chu

(10) Patent No.: US 8,878,666 B2
(45) Date of Patent: Nov. 4, 2014

(54) EMERGENCY SIGN HAVING BEACON MODULE FOR INDOOR POSITIONING AND INDOOR POSITIONING SYSTEM

(71) Applicant: Kyo Koan Chu, Daegu (KR)

(72) Inventor: Kyo Koan Chu, Daegu (KR)

(73) Assignee: Winitech Co., Ltd., Daegu (KR)

( * ) Notice: Subject to any disclaimer, the term of this patent is extended or adjusted under 35 U.S.C. 154(b) by 24 days.

(21) Appl. No.: 13/773,396

(22) Filed: Feb. 21, 2013

(65) Prior Publication Data
US 2014/0167956 A1 Jun. 19, 2014

(30) Foreign Application Priority Data
Dec. 14, 2012 (KR) ........................ 10-2012-0146087

(51) Int. Cl.
| G08B 1/08 | (2006.01) |
| G08B 7/06 | (2006.01) |
| G01S 1/04 | (2006.01) |
| G01C 3/08 | (2006.01) |
| H01K 1/62 | (2006.01) |
| G01S 5/02 | (2010.01) |

(52) U.S. Cl.
CPC . *G08B 7/062* (2013.01); *G01S 1/04* (2013.01); *G01C 3/08* (2013.01); *H01K 1/62* (2013.01); *G01S 5/0231* (2013.01); *G08B 7/066* (2013.01)
USPC .............. 340/539.1; 340/539.23; 340/539.26; 340/500; 340/686.6; 340/573.1; 340/572.1; 340/572.7; 362/147; 362/276; 362/217.1; 362/429; 40/541; 40/546; 40/553; 40/570

(58) Field of Classification Search
CPC ................................. H04W 4/02; G08B 25/14
USPC ......... 340/539.1, 539.23, 539.26, 500, 686.6, 340/573.1, 572.1; 362/147, 276, 217.1, 362/429.02, 429; 40/541, 546, 553, 570
See application file for complete search history.

(56) References Cited

U.S. PATENT DOCUMENTS

| 8,468,726 B1 * | 6/2013 | Hetrick ........................... 40/546 |
| 2007/0069882 A1 * | 3/2007 | Mahajan ....................... 340/500 |
| 2012/0126700 A1 * | 5/2012 | Mayfield et al. ................. 315/86 |

FOREIGN PATENT DOCUMENTS

| JP | 2008-086024 | 4/2008 |
| KR | 10-2004-69375 | 8/2004 |
| KR | 1020040069375 | 8/2004 |
| KR | 10-2006-130715 | 12/2006 |
| KR | 1020060130715 | 12/2006 |

* cited by examiner

Primary Examiner — Tai T Nguyen
(74) Attorney, Agent, or Firm — IPLA P.A.; James E. Bame

(57) ABSTRACT

An emergency exit sign having a beacon module for indoor positioning and an indoor positioning system using the same are provided. The emergency exit sign includes a power supply unit, an AC/DC converter, an indoor positioning beacon module, an LED lamp, and a charger. The power supply unit receives an input of a power source and supplies the power source. The AC/DC converter converts the power source supplied and supplies a driving power source. The indoor positioning beacon module periodically wireless transmits a beacon signal including a beacon ID through a built-in antenna. The LED lamp is installed within the housing such that the lamp is positioned in rear of the display. When a power source is not supplied from the power supply unit, the charger supplies a driving power source.

5 Claims, 4 Drawing Sheets

EMERGENCY SIGN HAVING BEACON MODULE FOR INDOOR POSITIONING AND INDOOR POSITIONING SYSTEM

CROSS REFERENCES

This application claims the benefit of Korean Patent Application No. 10-2012-0146087, filed 14 Dec. 2012, which is hereby incorporated by reference in its entirety into this application.

BACKGROUND OF THE INVENTION

1. Field of the Invention

The present invention relates to an emergency exit sign having a beacon module for indoor positioning, and an indoor positioning system using the same. More particularly, the present invention relates to a technology capable of simply building an indoor positioning system at a low cost, by installing a beacon module for indoor positioning in an emergency exit sign to make accurate indoor positioning possible.

2. Description of the Related Art

In recent years, an initial Global Positioning System (GPS) technology developed for military use is being widely used for civilian purposes of navigation, measurement, cartography and the like. Also, even a Location Based Service (LBS) using a GPS receiver as a positioning sensor has been commercialized.

But, it frequently occurs that the GPS receiver cannot receive a GPS satellite signal within doors, a metropolitan area of many high-rise buildings, an underground parking lot, a subway, a tunnel and the like. For this reason, there is a problem that the GPS receiver cannot provide consecutive user location information to a user indoors.

To fix this problem, many researches have been made on an indoor positioning technology of installing an Access Point (AP) within a building and enabling the AP to locate a target within doors using a Radio Frequency (RF) signal, and a service based on this. Active researches have been made on wireless indoor positioning technologies using infrared rays, ultrasonic waves and the like in addition to the RF signal.

The RF signal based indoor positioning technology is a technology of locating a target through a relative Received Signal Strength Indication (RSSI) received from a previously installed access point. The infrared ray based indoor positioning technology is a technology in which infrared sensors installed throughout the indoor recognize an infrared device having a unique IDentifier (ID) code and locate the infrared device. The ultrasonic wave based indoor positioning technology is a technology of locating a target using a transfer rate difference between a fast RF signal and a relative slow ultrasonic wave.

However, the aforementioned indoor positioning technologies excepting the ultrasonic wave based indoor positioning technology have a disadvantage of generally not only causing a large measurement error but also requiring very many access points, infrared sensors or the like. Also, because even an error of positioning information measurement is great more than a few meters, many inconveniences of use are caused.

Owing to the characteristic in which an RF signal is difficult to permeate walls, in many cases, the RF signal based indoor positioning technology is difficult to detect an accurate current location of a user within doors and is also difficult to detect an accurate location of the user between floors. Further, owing to a limitation on a basic reception distance of infrared rays, the infrared ray based indoor positioning technology has a problem that service is restrictive, and the cost of system installation and maintenance is very high. Further, the ultrasonic wave based indoor positioning technology enables accurate measurement, but has a problem that the cost of system installation is very high.

That is, the conventional indoor positioning technologies have a problem of having to bear the investment cost for expensive system building, because they cannot implement indoor positioning if an expensive indoor positioning system is not equipped.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to simply build an indoor positioning system at a low cost, by installing a beacon module for indoor positioning in an emergency exit sign to make accurate indoor positioning possible.

According to one aspect of the present invention, an emergency exit sign is provided. The emergency exit sign has a housing having an opening in front, and a display of semi-transparent material installed in the housing such that a front surface of the display is exposed to the external through the opening. The emergency exit sign includes a power supply unit, an Alternating Current/Direct Current (AC/DC) converter, an indoor positioning beacon module, a Light Emitting Diode (LED) lamp, and a charger. The power supply unit receives an input of a power source from the external and supplies the power source to the AC/DC converter. The AC/DC converter converts the power source supplied from the power supply unit and supplies a driving power source to an indoor positioning beacon module. The indoor positioning beacon module periodically wireless transmits a beacon signal including a beacon IDentifier (ID) to the external through a built-in antenna. The LED lamp is installed within the housing such that the lamp is positioned in rear of the display. When a power source is not supplied from the power supply unit, the charger supplies a driving power source to the indoor positioning beacon module and the LED lamp.

The indoor positioning beacon module may further include a mounting guide member for spacing the built-in antenna as much as the same distance such that, when the built-in antenna is mounted, the built-in antenna is not released and interfered.

According to another aspect of the present invention, an indoor positioning system is provided. The system includes at least one or more emergency exit signs, a portable terminal, and a positioning server. The at least one or more emergency exit signs each have an indoor positioning beacon module for periodically wireless transmitting a beacon signal including a beacon ID to the external. The portable terminal receives a beacon signal from the emergency exit sign located around the portable terminal through wireless communication, extracts a beacon ID from the received beacon signal, detects a strength of the beacon signal, and stores the extracted beacon ID and the detected strength of the beacon signal in a memory, and periodically includes each of the beacon ID and signal strength stored in the memory in a location estimation message and wireless transmits the location estimation message to the external. The positioning server receives the location estimation message from the portable terminal through the wireless communication, determines a location of a user who carries the portable terminal on the basis of information included in the received location estimation message, maps the determined location of the user on a map, and wireless transmits the mapped location to the portable terminal.

The emergency exit sign may have a housing having an opening in front, and a display of semitransparent material installed in the housing such that a front surface of the display is exposed to the external through the opening. The emergency exit sign may include a power supply unit, an AC/DC converter, an indoor positioning beacon module, an LED lamp, and a charger. The power supply unit receives an input of a power source from the external and supplies the power source to the AC/DC converter. The AC/DC converter converts the power source supplied from the power supply unit and supplies a driving power source to an indoor positioning beacon module. The indoor positioning beacon module periodically wireless transmits a beacon signal including a beacon ID to the external through a built-in antenna. The LED lamp is installed within the housing such that the lamp is positioned in rear of the display. When a power source is not supplied from the power supply unit, the charger supplies a driving power source to the indoor positioning beacon module and the LED lamp.

In the emergency exit sign, the indoor positioning beacon module may further include a mounting guide member for spacing the built-in antenna as much as the same distance such that, when the built-in antenna is mounted, the built-in antenna is not released and interfered.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF THE INVENTION

Exemplary embodiments of the present invention will now be described in detail with reference to the annexed drawings.

In the following description, well-known functions or constructions are not described in detail since they would obscure the invention in unnecessary detail.

Figure 1A:
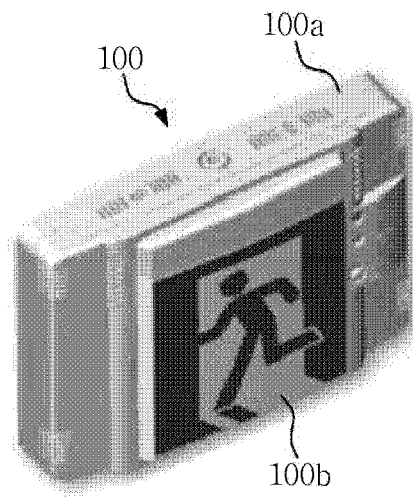
FIGS. 1A, 1B and 2 are diagrams illustrating an emergency exit sign according to an exemplary embodiment of the present invention.
Figure 1B:
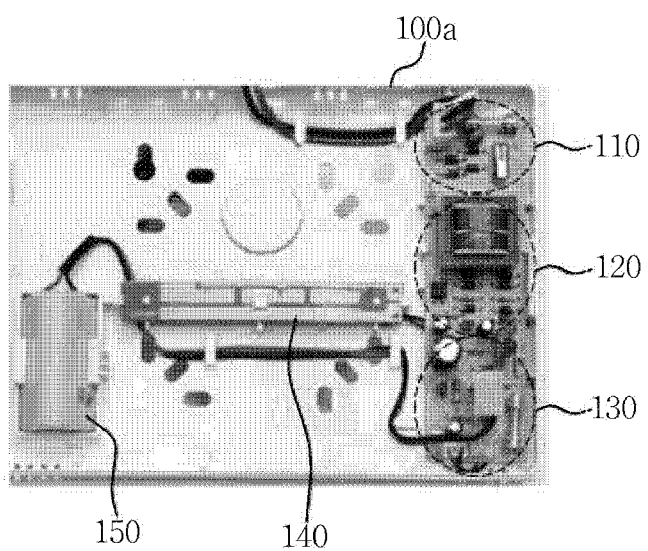
Figure 2:
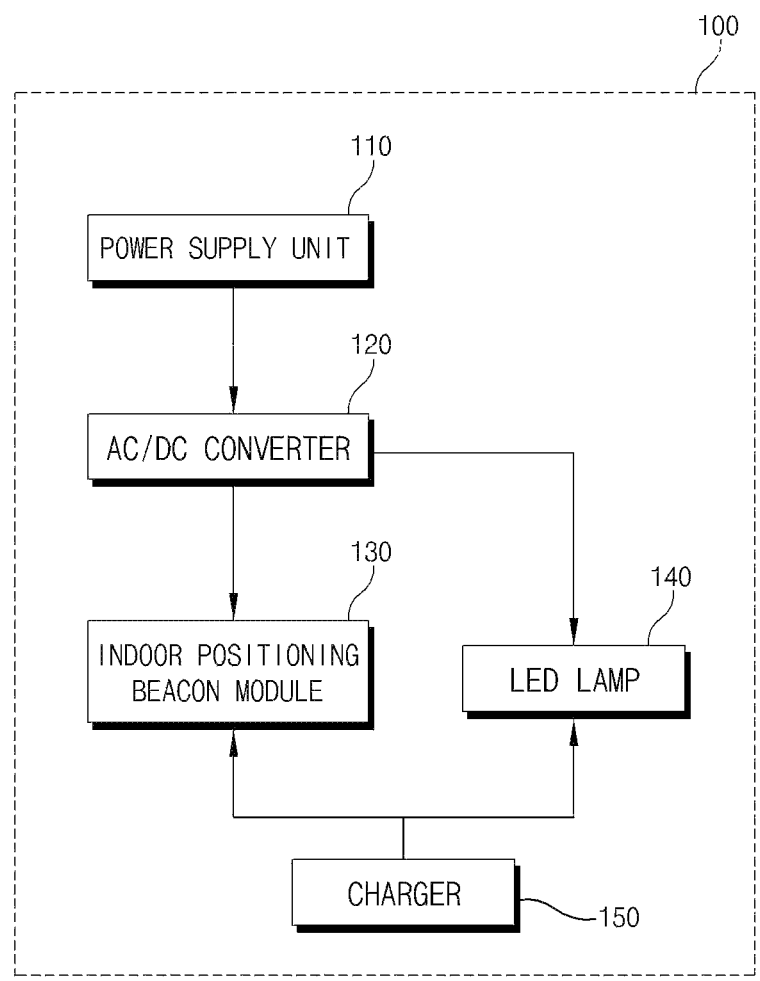
Figure 3:
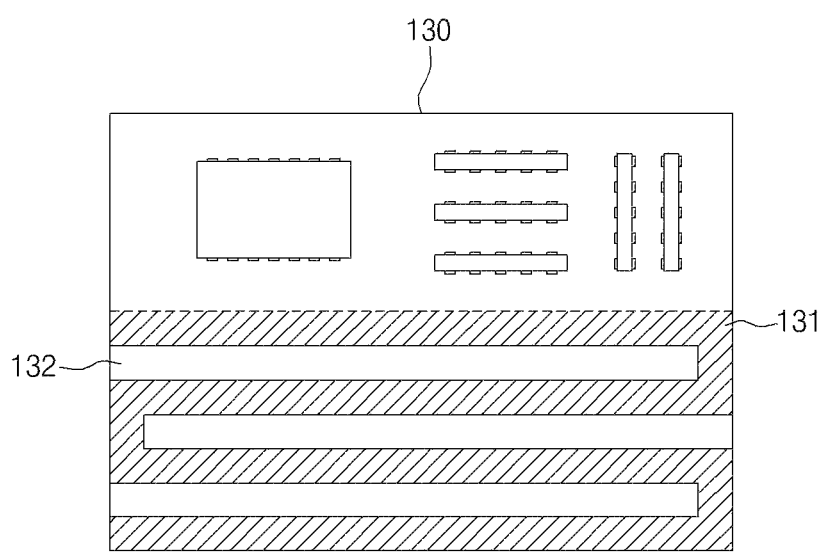
FIG. 3 is a diagram illustrating an indoor positioning beacon module of an emergency exit sign according to an exemplary embodiment of the present invention.

FIGS. 1A, 1B and 2 are diagrams illustrating an emergency exit sign according to an exemplary embodiment of the present invention. FIG. 3 is a diagram illustrating an indoor positioning beacon module of an emergency exit sign according to an exemplary embodiment of the present invention.

Referring to FIGS. 1A, 1B and 2, the emergency exit sign 100 according to an exemplary embodiment of the present invention includes a housing 100a and a display 100b. A power supply unit 110, an Alternating Current/Direct Current (AC/DC) converter 120, an indoor positioning beacon module 130, a Light Emitting Diode (LED) lamp 140, and a charger 150 are provided within the housing 100a.

The housing 100a has an opening in its front. The display 100b is of semitransparent material, and is installed in the housing 100a such that a front surface of the display 100b is exposed to the external through the opening of the housing 100a.

The power supply unit 110 receives an input of a power source from the external and supplies the power source to the AC/DC converter 120. The AC/DC converter 120 converts a power source supplied from the power supply unit 110 and supplies a driving power source (for example, a voltage of 5 Volts (V)) to the indoor positioning beacon module 130 and the LED lamp 140.

The indoor positioning beacon module 130 periodically wireless transmits a beacon signal including a beacon IDentifier (ID) to the external through a built-in antenna 131 (referring to FIG. 3).

Here, as illustrated in FIG. 3, the indoor positioning beacon module 130 further includes a mounting guide member 132 for spacing a built-in antenna 131 as much as the same distance such that, when the built-in antenna 131 is mounted, the built-in antenna 131 is not released and interfered. The mounting guide member 132 is formed in a form of a release prevent jaw or a release prevention protrusion.

The LED lamp 140 is installed within the housing 100a such that it is placed in rear of the display 100b. When a power source is not supplied from the power supply unit 110, the charger 150 supplies a driving power source to the indoor positioning beacon module 130 and the LED lamp 140.

Figure 4:
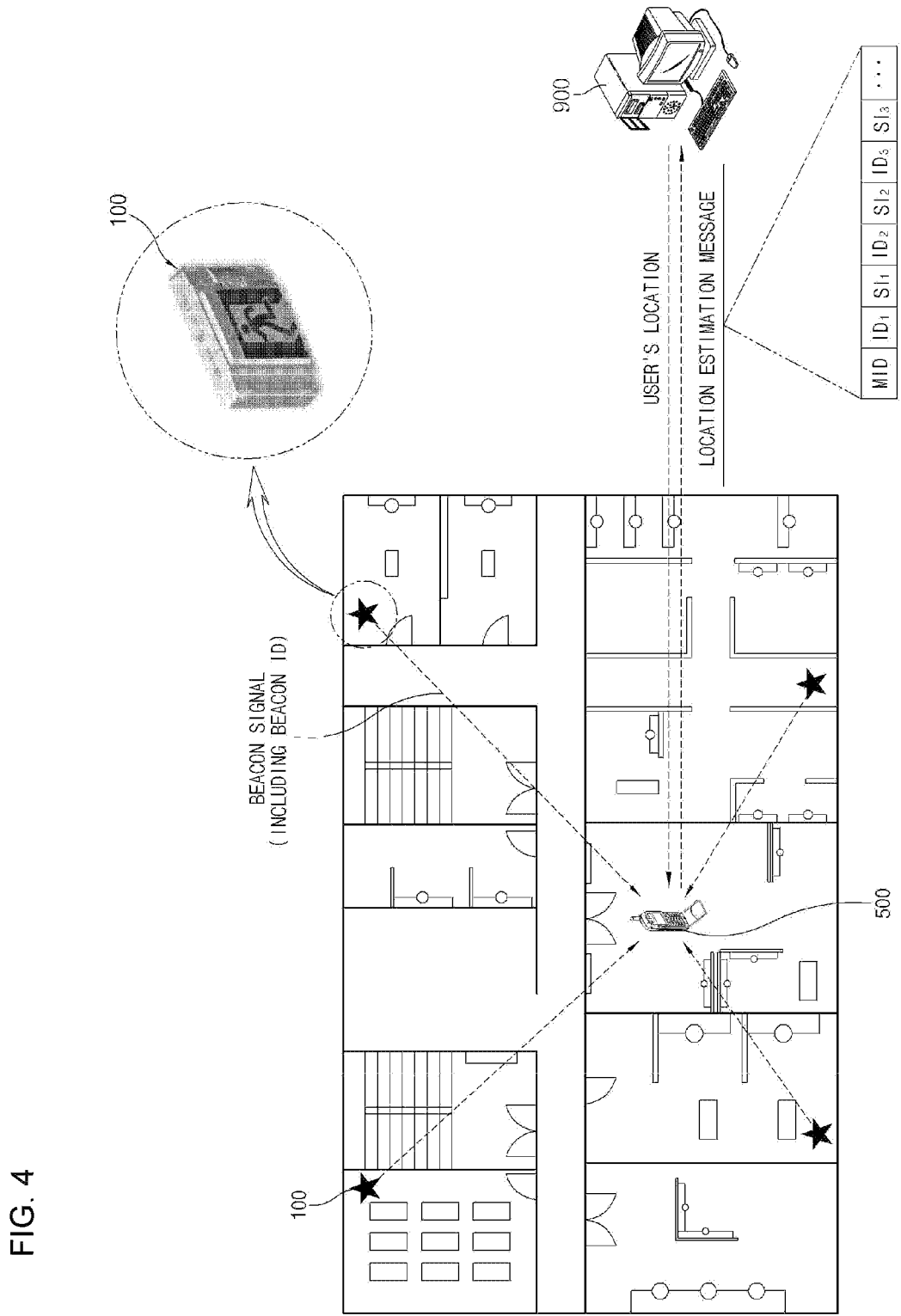
FIG. 4 is a diagram illustrating an indoor positioning system according to an exemplary embodiment of the present invention.

FIG. 4 is a diagram illustrating an indoor positioning system according to an exemplary embodiment of the present invention.

Referring to FIG. 4, if an emergency exit sign 100 of the present invention wireless transmits a beacon signal including a beacon ID to a portable terminal 500, the portable terminal 500 carried by a user who is within doors receives the beacon signal from the emergency exit sign 100, which is located around the portable terminal 500, through wireless communication.

Here, the portable terminal 500 refers to a terminal capable of, in a state where an indoor positioning application is executed, transmitting/receiving various data with the emergency exit sign 100 and an indoor positioning server 900 through the wireless communication. The portable terminal 500 can be any one of a tablet Personal Computer (PC) in which wireless communication is possible and application installation is possible, a smart phone, a Personal Digital Assistant (PDA), and a mobile communication terminal. And, the portable terminal 500 can receive beacon signals from one or more emergency exit signs 100, respectively, because one or more emergency exit signs 100 can be located around the portable terminal 500.

After receiving the beacon signal, the portable terminal 500 extracts the beacon ID from the received beacon signal, detects a strength of the beacon signal, and stores the extracted beacon ID and the detected signal strength in a memory (not shown). The portable terminal 500 periodically includes the beacon ID and signal strength stored in the memory in a location estimation message and wireless transmits the location estimation message to the external positioning server 900.

In an exemplary embodiment, a header of the location estimation message includes identification information (i.e., a Manufacturer's IDentification number (MID)) of the portable terminal 500, and a body of the location estimation message includes beacon IDs ($ID_1$, $ID_2$, $ID_3$, ...) acquired from respective beacon signals and strengths ($SI_1$, $SI_2$, $SI_3$, ...) of the beacon signals.

If the portable terminal 500 wireless transmits a location estimation message to the external positioning server 900, the external positioning server 900 receives the location estimation message from the portable terminal 500, determines a location of a user who carries the portable terminal 500 on the basis of information included in the location estimation message, maps the determined location of the user on a map, and transmits the mapped location of the user to the portable terminal 500.

In an exemplary embodiment, the positioning server 900 may transmit the location of the user to external systems (e.g., building management systems, fire rescue systems, public institutions, information provision systems and the like).

That is, the present invention can detect an accurate current location of a user who carries a portable terminal using the emergency exit sign 100 equipped with the indoor positioning beacon module 130 and accordingly, can simply build an indoor positioning system at a low cost compared to the related art.

Further, the present invention can detect an accurate current location of a user who carries a portable terminal on the basis of strengths of beacon signals received from emergency exit signs 100. Therefore, when a fire or an emergency occurs within a building, a tunnel or the like, the present invention can transmit an evacuation route to the portable terminal 500 of the user to evacuate the user even without going to check if there are persons within doors one by one, making possible rapid lifesaving and initial response against the fire or emergency.

As described above, exemplary embodiments of the present invention have an effect of being capable of simply building an indoor positioning system at a low cost, by installing a beacon module for indoor positioning in an emergency exit sign to make accurate indoor positioning possible.

Also, exemplary embodiments of the present invention can detect an accurate current location of a user who carries a portable terminal on the basis of strengths of beacon signals received from emergency exit signs and thus, have an effect of, when a fire or an emergency occurs within a building, being capable of rapidly detecting current locations of users who carry portable terminals and evacuate the users even without going to check if there are persons within doors one by one, and making possible rapid lifesaving and initial response against the fire or emergency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An emergency exit sign having a housing having an opening in front, and a display of semitransparent material installed in the housing such that a front surface of the display is exposed to an external through the opening, the emergency exit sign comprising:
    a power supply unit for receiving an input of a power source from the external and supplying the power source to an Alternating Current/Direct Current (AC/DC) converter;
    the AC/DC converter for converting the power source supplied from the power supply unit and supplying a driving power source to an indoor positioning beacon module;
    the indoor positioning beacon module for periodically wireless transmitting a beacon signal comprising a beacon IDentifier (ID) to the external through a built-in antenna;
    a Light Emitting Diode (LED) lamp installed within the housing such that the lamp is positioned in rear of the display; and
    a charger for, when a power source is not supplied from the power supply unit, supplying a driving power source to the indoor positioning beacon module and the LED lamp.

2. The emergency exit sign of claim 1, wherein the indoor positioning beacon module further comprises a mounting guide member for spacing the built-in antenna such that, when the built-in antenna is mounted, the built-in antenna is not released and interfered.

3. An indoor positioning system comprising:
    at least one or more emergency exit signs each having an indoor positioning beacon module for periodically wireless transmitting a beacon signal comprising a beacon Identifier (ID) to an external;
    a portable terminal for receiving a beacon signal from the emergency exit sign located around the portable terminal through wireless communication, extracting a beacon ID from the received beacon signal, detecting a strength of the beacon signal, and storing the extracted beacon ID and the detected strength of the beacon signal in a memory, and periodically comprising each of the beacon ID and signal strength stored in the memory in a location estimation message and wireless transmitting the location estimation message to the external; and
    a positioning server for receiving the location estimation message from the portable terminal through the wireless communication, determining a location of a user who carries the portable terminal on a basis of information comprised in the received location estimation message, mapping the determined location of the user on a map, and wireless transmitting the mapped location to the portable terminal.

4. The indoor positioning system of claim 3, wherein the emergency exit sign has a housing having an opening in front, and a display of semitransparent material installed in the housing such that a front surface of the display is exposed to the external through the opening, and
    wherein the emergency exit sign comprises:
    a power supply unit for receiving an input of a power source from the external and supplying the power source to an Alternating Current/Direct Current (AC/DC) converter;
    the AC/DC converter for converting the power source supplied from the power supply unit and supplying a driving power source to an indoor positioning beacon module;
    the indoor positioning beacon module for periodically wireless transmitting a beacon signal comprising a beacon IDentifier (ID) to the external through a built-in antenna;
    a Light Emitting Diode (LED) lamp installed within the housing such that the lamp is positioned in rear of the display; and
    a charger for, when a power source is not supplied from the power supply unit, supplying a driving power source to the indoor positioning beacon module and the LED lamp.

5. The indoor positioning system of claim 4, wherein, in the emergency exit sign, the indoor positioning beacon module further comprises a mounting guide member for spacing the built-in antenna as much as the same distance such that, when the built-in antenna is mounted, the built-in antenna is not released and interfered.

* * * * *